United States Patent
Rouille

(10) Patent No.: US 12,296,696 B2
(45) Date of Patent: May 13, 2025

(54) POWER SUPPLY SYSTEM AND METHOD OF CONTROLLING SUCH A POWER SUPPLY SYSTEM

(71) Applicant: ALSTOM Holdings, Saint-Ouen-sur-Seine (FR)

(72) Inventor: Bruno Rouille, Ordizan (FR)

(73) Assignee: ALSTOM Holdings, Saint-Ouen-sur-Seine (FR)

( * ) Notice: Subject to any disclaimer, the term of this patent is extended or adjusted under 35 U.S.C. 154(b) by 228 days.

(21) Appl. No.: 17/538,087

(22) Filed: Nov. 30, 2021

(65) Prior Publication Data

US 2022/0169128 A1   Jun. 2, 2022

(30) Foreign Application Priority Data

Nov. 30, 2020   (FR) ...................... 20 12384

(51) Int. Cl.
*B60L 50/71*   (2019.01)
*B60K 1/04*   (2019.01)
(Continued)

(52) U.S. Cl.
CPC ................ *B60L 50/71* (2019.02); *B60K 1/04* (2013.01); *B60L 1/003* (2013.01); *B60L 15/20* (2013.01);
(Continued)

(58) Field of Classification Search
CPC ......... B60W 10/24; B60W 10/26; B60L 1/00; B60L 50/71; B60L 58/13; B60L 15/20; B60L 58/40; B60L 1/003; B60L 2200/26; H01M 10/44; H01M 10/48; H01M 10/425; H01M 8/04925; H01M 16/006;
(Continued)

(56) References Cited

U.S. PATENT DOCUMENTS

| | | | | |
|---|---|---|---|---|
| 2009/0115351 A1* | 5/2009 | Heap | ...................... | B60W 20/10 180/65.265 |
| 2013/0065089 A1* | 3/2013 | Kazuno | ............. | H01M 8/04753 429/9 |

(Continued)

FOREIGN PATENT DOCUMENTS

| | | |
|---|---|---|
| DE | 102 33 821 A1 | 2/2004 |
| EP | 3 709 416 A1 | 9/2020 |

OTHER PUBLICATIONS

French Search Report issued for French Patent Application No. 20 12384, dated Aug. 2, 2021 in 2 pages.

*Primary Examiner* — Anne Marie Antonucci
*Assistant Examiner* — Jared C Bean
(74) *Attorney, Agent, or Firm* — Knobbe, Martens, Olson & Bear, LLP

(57) ABSTRACT

A method of controlling a power supply system for an electric vehicle includes acquiring a first power setpoint value corresponding to the electrical power to be supplied by the battery, determining the electrical power required by the drivetrain and the electrical power required by the at least one auxiliary apparatus, determining the state of the battery, calculating at least one electrical power value to be delivered by the fuel cell, and calculating a second setpoint value for the electrical power to be delivered by the fuel cell. The second setpoint value is optimized so that the fuel cell operates at or near its maximum efficiency point.

7 Claims, 3 Drawing Sheets

(51) Int. Cl.
*B60L 1/00* (2006.01)
*B60L 15/20* (2006.01)
*B60L 58/13* (2019.01)
*B60W 10/24* (2006.01)
*B60W 10/26* (2006.01)
*H01M 16/00* (2006.01)

(52) U.S. Cl.
CPC ............. *B60L 58/13* (2019.02); *B60W 10/24* (2013.01); *B60W 10/26* (2013.01); *H01M 16/006* (2013.01)

(58) Field of Classification Search
CPC ......... H01M 8/04992; H01M 8/04604; H01M 2220/20; H01M 2250/20; B60K 1/04; Y02E 60/10; Y02T 10/70
See application file for complete search history.

(56) References Cited

U.S. PATENT DOCUMENTS

| | | | | |
|---|---|---|---|---|
| 2015/0134282 A1* | 5/2015 | Soga | ................ | H01M 10/48 702/63 |
| 2019/0160963 A1* | 5/2019 | Yoon | ................ | B60L 1/003 |

* cited by examiner

POWER SUPPLY SYSTEM AND METHOD OF CONTROLLING SUCH A POWER SUPPLY SYSTEM

CROSS-REFERENCE TO RELATED APPLICATION

This application claims priority to French Patent Application No. 20 12384 filed on Nov. 30, 2020, the disclosure of which including the specification, the drawings, and the claims is hereby incorporated by reference in its entirety.

TECHNICAL FIELD

The present invention relates to power supply systems and methods for controlling such power supply systems.

The invention is particularly applicable to power supply systems used in electric vehicles.

BACKGROUND

Electric vehicles, and more particularly electrically-driven rail vehicles, generally include an electricity storage system comprising, for example, one or more electrochemical storage batteries.

It is now common practice to add a fuel cell to the electricity storage system to provide power to supplement the battery and thus increase the range of the vehicle.

Thus, the vehicle's drivetrain can be powered when the vehicle is not being supplied with electricity from an external source, for example when the vehicle is travelling in an area without a catenary or power rail.

However, in practice, the range of the fuel cell is limited due to technical constraints on the storage of hydrogen aboard the vehicle.

The hydrogen needed to operate the fuel cell is stored in a special tank aboard the vehicle. However, the hydrogen storage techniques currently available require the use of large, heavy tanks, which are also very expensive. For example, storing one kilogram of hydrogen requires a 25-kilogram tank.

In many applications, e.g. in rail or passenger transport, the traction equipment has to remain at a reasonable size and weight, so that it is not possible to increase the amount of hydrogen stored aboard the vehicle at will.

However, the fuel cell must have sufficient energy autonomy to contribute to powering the vehicle.

The invention intends to remedy these drawbacks in particular by proposing an improved power supply system, in particular for an electric vehicle, comprising a battery and a fuel cell, in which hydrogen consumption is optimised.

SUMMARY

To this end, according to one aspect, the invention relates to a method of controlling a power supply system for an electric vehicle comprising a battery, a fuel cell and a power conversion device connected to the battery and to the fuel cell, the power supply system being configured to supply power to an electric drivetrain of the vehicle and to at least one auxiliary apparatus, the method comprising steps of:

acquiring a first power setpoint value corresponding to the electrical power to be supplied by the battery;

determining the electrical power required by the drivetrain and the electrical power required by the at least one auxiliary apparatus;

determining the state of the battery, particularly the state of charge of the battery and the maximum available power that the battery can provide;

calculating at least one value of electrical power to be delivered by the fuel cell depending on the state of the battery and the electrical power required by the drivetrain and the at least one auxiliary apparatus;

calculating, from the calculated value of electrical power, a second setpoint value for the electrical power to be delivered by the fuel cell, this value being optimised so that the fuel cell operates at or near its maximum efficiency point controlling the power supply system according to the second calculated electrical power setpoint value.

By optimising the operation of the fuel cell, it is possible to reduce the consumption of hydrogen without degrading the operation of the fuel cell or its ability to provide electrical power when the vehicle needs it. Thus, for a given volume of hydrogen stored in the vehicle, the vehicle's range is increased without the need to install a larger tank, which would be more expensive, more massive and more cumbersome.

According to advantageous but not mandatory aspects, such a power supply system may incorporate one or more of the following features, taken in any combination that is technically feasible:

The calculating of at least one value of electrical power to be delivered by the fuel cell comprises the calculating of a minimum and a maximum value of power to be delivered by the fuel cell, the second electrical power setpoint value being between said minimum and said maximum value.

The minimum value is equal to the sum of the power required by the drivetrain and the power required by the auxiliary components minus the maximum power that can be delivered by the battery.

The maximum value is equal to the sum of the power required by the drivetrain and the power required by the auxiliary components minus the minimum power that can be delivered by the battery.

The second setpoint value is calculated from a predefined efficiency curve of the fuel cell.

Calculating the second setpoint value involves selecting an operating point of the fuel cell corresponding to the maximum of the efficiency curve in an operating range between the minimum and maximum values previously calculated.

The first power setpoint value is previously calculated based on a target value of a state of charge of the battery.

The method is implemented in response to a control command from a driver of the vehicle, for example an acceleration or braking command, which has the effect of changing the power consumption of the drivetrain and/or the auxiliary apparatus.

The second power setpoint value is selected so that when the fuel cell delivers electrical power corresponding to the second power setpoint value, the battery delivers electrical power corresponding to the calculated first setpoint value.

BRIEF DESCRIPTION OF THE DRAWINGS

The invention will be better understood and advantages beyond these will emerge more clearly in light of the following description of an embodiment of a given power supply system, given solely by way of example and made with reference to the accompanying drawings, in which.

DETAILED DESCRIPTION OF SOME EMBODIMENTS

Figure 1:
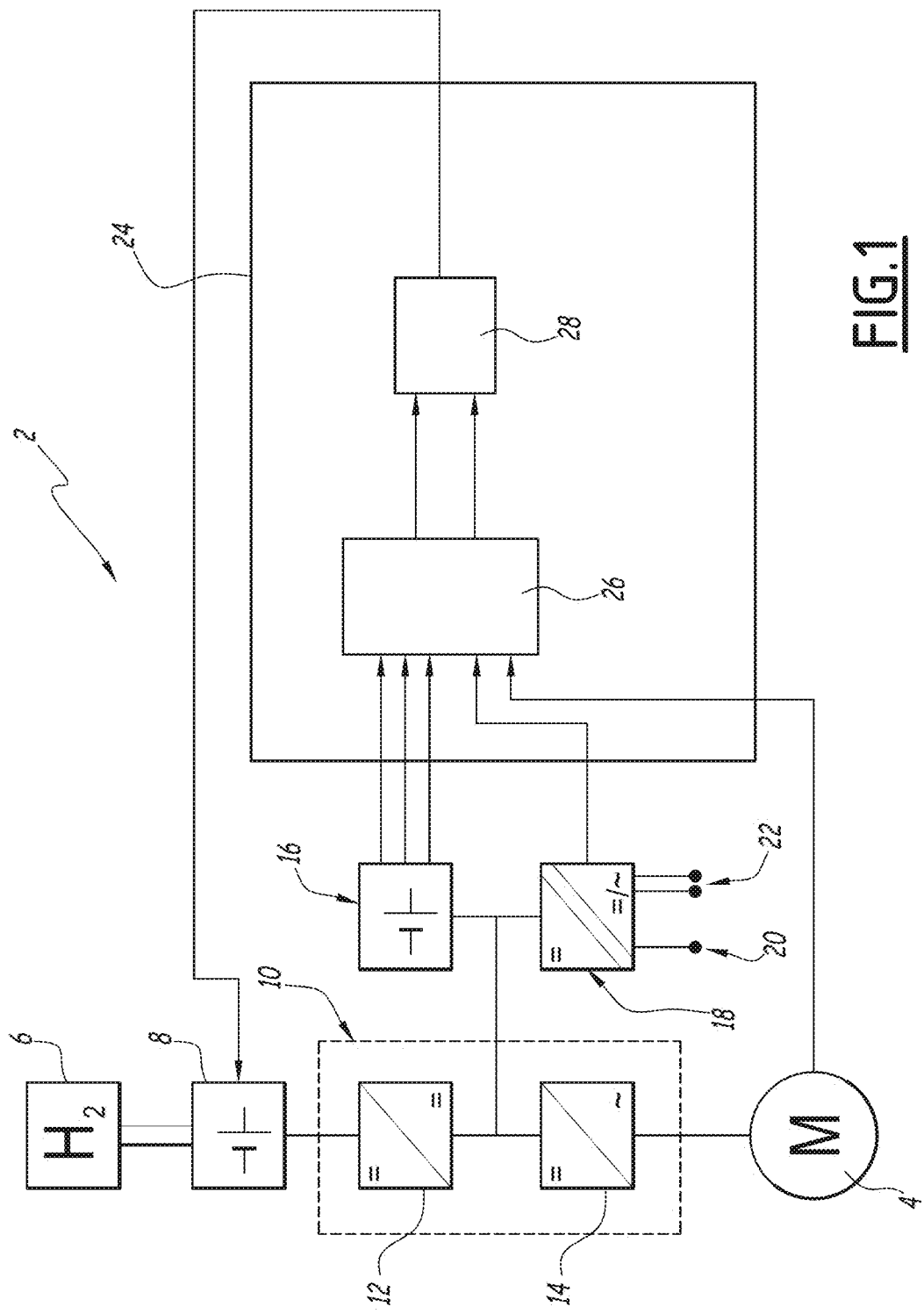
FIG. 1 is a block diagram of a power supply system for a railway vehicle according to an embodiment of the invention comprising a fuel cell.

FIG. 1 shows an electric vehicle 2 comprising a power supply system.

The electric vehicle 2 can be an electrically-driven railway vehicle.

According to non-limiting examples, the rail vehicle can be a passenger train, or a high-speed train, or a locomotive, or a service vehicle such as a track motorcar or a railcar mover, or an urban transport vehicle such as a metro or a tram.

Alternatively, the vehicle 2 may be an electric road vehicle, such as an electric bus or an electric truck.

According to examples, the vehicle 2 comprises an electric drivetrain comprising one or more electric motors 4 preferably configured to set the vehicle in motion along a track.

In the example shown, the or each motor 4 is mechanically coupled to a load, such as one or more wheels of a bogie or drive axle. Alternatively, the drivetrain may comprise one or more loads of a different nature.

The power supply system is also configured to supply power to one or more of the vehicle's auxiliary apparatuses 2.

For example, the auxiliary apparatuses comprise at least one or more auxiliary apparatus of the vehicle 2, such as a heating, ventilation, or air conditioning system, or one or more motors for opening or closing automatic vehicle doors, or a lighting system, or a passenger information system, or any other equivalent apparatus, these examples not being limiting.

As illustrated in FIG. 1, the power supply system comprises a first energy storage device comprising a hydrogen tank 6 and a fuel cell 8, both of which are carried aboard the vehicle 2.

A power conversion device 10 is connected to the fuel cell 8 and is configured to convert the voltage output by the fuel cell 8 to provide electrical power to the motor 4 and auxiliary apparatuses.

The conversion device 10 comprises a first power converter 12 and a second power converter 14.

The first converter 12 is connected to the output of the fuel cell 8. For example, the first converter 12 is a DC-DC step-up voltage converter, such as a chopper.

The second converter 14 is connected to the motor 4. For example, it is an inverter that converts the DC voltage delivered by the first converter 12 to an AC voltage to power the motor 4.

According to one non-limiting example, the voltage at the terminals of the fuel cell 8 may vary according to the electrical power required from the fuel cell 8 when it is in operation. In practice, this voltage is lower than the voltage between the conductors of the internal DC power bus (here between converters 12 and 14).

The power supply system includes a second energy storage device comprising a battery 16.

Advantageously, the battery 16 may comprise an electrochemical storage battery. Alternatively, the battery 16 may comprise a capacitor bank or supercapacitor bank, or any suitable electricity storage technology. In some cases, such as capacitors or supercapacitors, it may be necessary to add a DC/DC output converter, such as a step-up chopper.

In one non-limiting example, the battery 16 has a voltage of 750 V DC or greater across its terminals when charged.

Advantageously, the battery 16 is connected to the conversion device 10 to supply electrical power to the motor 4 and the auxiliary equipment. For example, the battery 16 is connected to the input of the second converter 14. Alternatively, the power supply system may comprise a second DC/DC conversion stage to raise the output voltage to a voltage of 1,500 V, for example to be compatible with the voltage required by the traction motor.

The battery 16 can also be recharged by the fuel cell 8 or by electrical energy collected by a collection device of the vehicle 2, such as a pantograph or pickup shoe or any equivalent system.

The auxiliary equipment is supplied by an additional power converter 18 which can be supplied by the battery 16 and/or the fuel cell 8 via the conversion device 10.

In the example shown, the input of the additional converter 18 is connected to the output of the battery 16 and the output of the first converter 12.

Advantageously, the additional converter 18 has a first output 20 that delivers a DC voltage and a second output 22 that delivers a second AC voltage, which may be a three-phase electrical voltage.

According to one non-limiting example, the DC voltage is 24 V DC and the AC voltage is 400 V AC.

According to embodiments, the battery 16 and the fuel cell 8 are capable of storing energy to at least partially electrically power the vehicle 2, in particular to power the motor 4 and/or auxiliary equipment, when the vehicle 2 is not being powered by an external power source. This is the case, for example, when the vehicle 2 is travelling on a section of track without a catenary or power rail.

The supervision and regulation of the power supply system, and in particular of the first storage device, which is the primary energy source, and of the second storage device, which is the energy storage system, are carried out automatically by one or more electronic control devices, which may belong to the power supply system.

In some embodiments, the fuel cell 8 is preferably used in addition to the battery 16.

The battery 16 is preferably used in such a way that its state of charge remains within a predetermined range, for example between 20% and 90% of its maximum capacity, in order to avoid premature wear of the battery or a deterioration in its performance.

The fuel cell 8 is therefore preferentially activated when the electrical power required from the battery would cause its state of charge to vary outside the predetermined range.

In addition, the battery 16, by its very nature, has a shorter response time than the fuel cell 8 and is better able to withstand repeated power fluctuations than the fuel cell 8.

The fuel cell 8 is therefore preferably used to respond to power demands over long periods of time, rather than to respond quickly to power demands that can vary rapidly and with a high amplitude of variation.

For example, an electronic controller associated with the battery 16 is programmed to calculate a target value for the state of charge, which is recalculated over time according to fluctuations in the charge of the battery 16 and the stresses imposed on the power supply system by the drivetrain and by the auxiliary equipment.

The electronic controller can advantageously determine, from the calculated state of charge target value, a first setpoint value for the electrical power to be supplied by the battery 16.

The energy management of the fuel cell 8 is advantageously carried out by an electronic control device 24 which is able to define a second power setpoint value to be supplied by the fuel cell 8 so that the power supply system meets its demands while allowing the battery 16 to reach the first calculated setpoint value.

In particular, the control device 24 is programmed to control the fuel cell 8 so that the fuel cell 8 delivers an electrical power whose value is optimised for a given time so that the fuel cell 8 operates at maximum efficiency and in accordance with the demands of the power supply system.

For this purpose, the control device 24 is able to automatically control the power supply system as a function of this second calculated power setpoint, for example by changing the amount of air and/or the amount of hydrogen supplied to the input of the fuel cell 8, in order to change the power supplied by the fuel cell 8. The control device 24 may also be configured to change the operation of the conversion device 10, for example by changing the electrical current setpoint of the first converter 12.

The control device 24 may also control an electrical switching device to connect or disconnect the fuel cell 8 from the rest of the power supply system.

In many embodiments, the control device 24 is implemented by an electronic circuit, for example mounted on an electronic board.

For example, the control device 24 comprises a processor, such as a programmable microcontroller, and a computer memory coupled to the processor and forming a computer-readable data storage medium.

According to examples, the memory is a ROM, or a RAM volatile memory, or a non-volatile memory of the EPROM, or EEPROM, or Flash type, or any suitable memory technology, or any possible combination of these memory technologies.

The memory includes executable instructions and/or software code, in particular for implementing a method in accordance with embodiments of the invention when these instructions and/or software code are executed by the processor.

Alternatively, the control device 24 comprises a programmable logic device (FPGA) or a dedicated integrated circuit configured to implement such methods.

According to embodiments, the control device 24 comprises a first calculation module 26, or energy management module, programmed to determine a value or range of values indicating the electrical power to be delivered by the fuel cell 8.

For example, the module 26 is able to measure and/or determine, for a given moment, the following electrical quantities:
- the power required by the drivetrain, for example in response to an acceleration command or a braking command from a driver,
- the power required by the auxiliary equipment,
- the state of charge of the battery 16,
- the maximum electrical power that the battery 16 can deliver when in a state of charge or a state of discharge.

In the example shown, the module 26 is then programmed to calculate the electrical power that the fuel cell should theoretically deliver as a function of the electrical quantities determined, but also as a function of the power setpoint of the battery.

For example, the module 26 calculates a minimum and a maximum value of power to be delivered by the fuel cell 8. The electrical power to be delivered by the fuel cell is between the said minimum and maximum values.

In one example, the minimum value is equal to the sum of the power required by the drivetrain and the power required by the auxiliary components minus the maximum power that can be delivered by the battery 16, especially when it is discharged. The minimum value is zero if the above quantity is less than zero.

In one example, the maximum value is equal to the sum of the power required by the drivetrain and the power required by the auxiliary components minus the minimum power that can be delivered by the battery 16, especially when it is discharged. The maximum value is zero if the above quantity is less than zero.

Thus, the power required from the fuel cell to supplement the power supplied by the battery 16 is equal to the power required for the battery to reach the target state of charge, minus the power required by the drivetrain and the power required by the auxiliary equipment.

According to embodiments, the control device 24 further comprises a second calculation module 28, or optimisation module, configured to calculate a target power value to be delivered by the fuel cell 8.

This calculation is made on the basis of the power values determined by the first module 26, and according to a predetermined efficiency curve expressing the efficiency of the fuel cell 8. Such a curve is for example stored in a memory of the control device 24.

Figure 2:
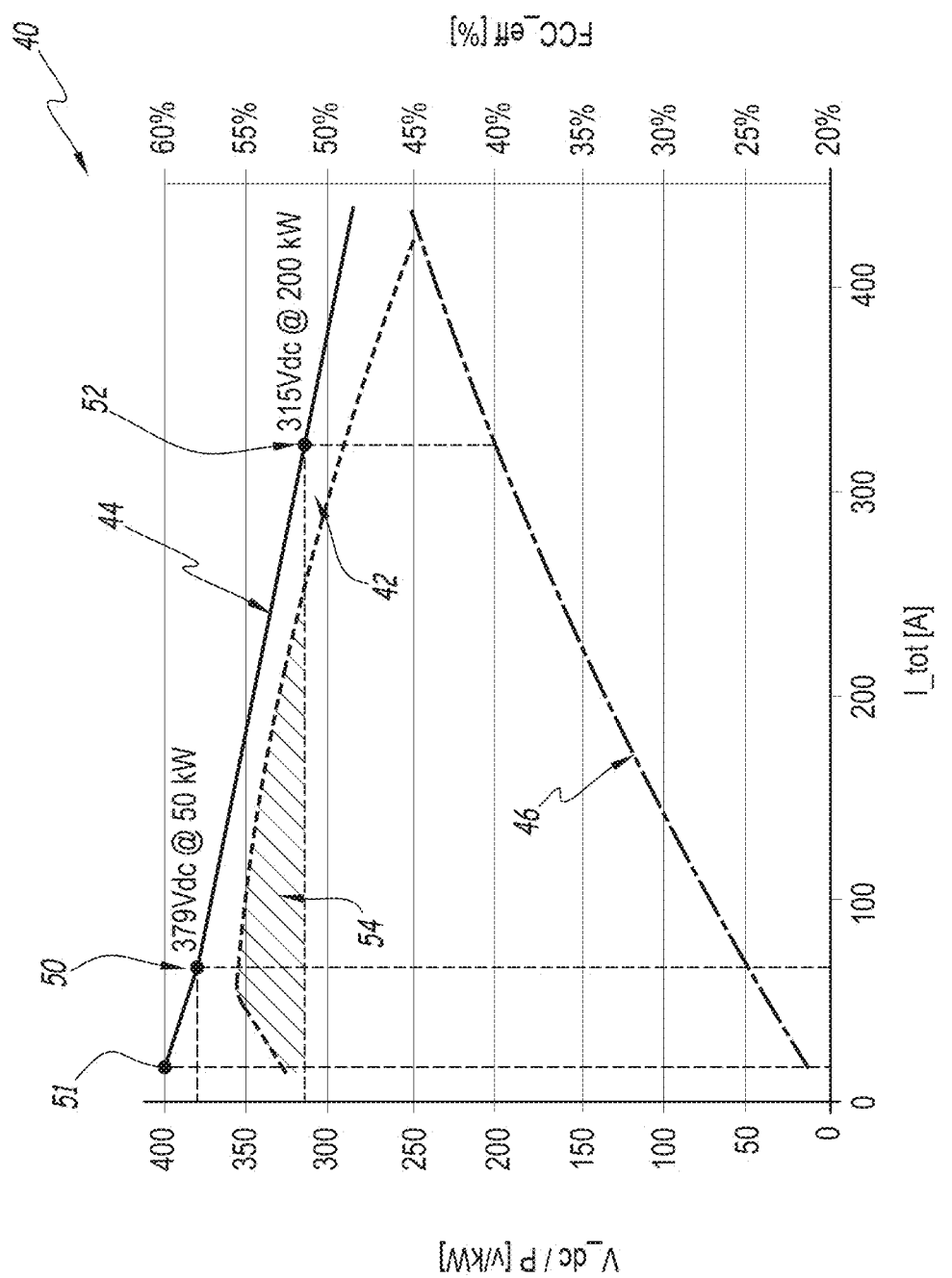
FIG. 2 depicts an efficiency curve of the fuel cell of FIG. 1.

FIG. 2 shows a graph 40 illustrating an example of the operation of the vehicle power supply system 2.

In this graph, the x-axis shows the total current I_tot, expressed in amperes, delivered by the fuel cell 8. The y-axis on the left corresponds to either the voltage delivered by the power supply system (curve 44) expressed in volts, or the power delivered by the power supply system (curve 46), expressed in kW. The right-hand y-axis shows the energy efficiency FCC_eff of fuel cell 8 (curve 42).

In this graph 40, curves 44, 46 indicate the electrical voltage of the power supply system and the total power delivered by the power supply system, respectively.

The point 50 represents the maximum power output of the fuel cell, corresponding here to a voltage of 379 V DC for a power of 50 kW.

The first point 51 represents a first power limit, here corresponding to a voltage of 390 V DC for a power of 20 kW.

The second point 52 represents a second power limit, associated with a second limit value, corresponding here to a voltage of 315 V DC for a power of 200 kW.

The zone 54 designates an operating zone of the fuel cell 8 in which it has a maximum or optimum efficiency. The zone 54 corresponds to a set of operating points of the fuel cell 8 for which the values lie between the first limit 51 and the second limit 52 and whose upper values are bounded by the energy efficiency curve 42 of the fuel cell 8.

Preferably, to set the second power setpoint, the module 28 selects an operating point within the area 54, preferably corresponding to the maximum of the efficiency curve 42 within the area 54 (point 50).

For example, the module 28 selects from this efficiency curve 42 a setpoint value between the minimum and maximum values calculated by the module 26 satisfying at least a plurality of the following criteria:

the power supplied by the battery 16 can, thanks to the additional power supplied by the fuel cell 8, converge towards the first setpoint value;

control commands issued by a driver, such as acceleration or braking commands, are complied with to the extent possible;

at least some, if not all, of the auxiliary equipment can be properly powered;

the fluctuations in the power required from the fuel cell 8 over time are preferably slow.

For example, the fuel cell operates at or near the maximum efficiency point as determined by the efficiency curve 42, or at a level close to that maximum efficiency point, for example within 10% of the maximum efficiency point.

The efficiency curve 42 can be predefined in advance, for example at the factory from the specifications of the fuel cell 8. Alternatively, the efficiency curve 42 may be calculated by the device 24 and updated over time as a function of the operation of the power supply system and/or as a function of wear and tear on the fuel cell 8.

In some implementations, if the power demand on the fuel cell 8 is low, for example below its minimum operating threshold, then the fuel cell 8 is not used so as not to overload the battery 16. In this case, the control device 24 controls the disconnecting of the fuel cell 8 or does not start the chopper 12.

In other implementations, the traction or braking setpoint causing the required electrical power fluctuation may have to be throttled by the control device 24 in the extreme case that the power demand is too great and the electrical supply system cannot meet the demand, for example because neither the fuel cell 8 nor the battery 16 can provide the required power. The control device 24 may also instruct the auxiliary equipment to reduce its power consumption.

Figure 3:
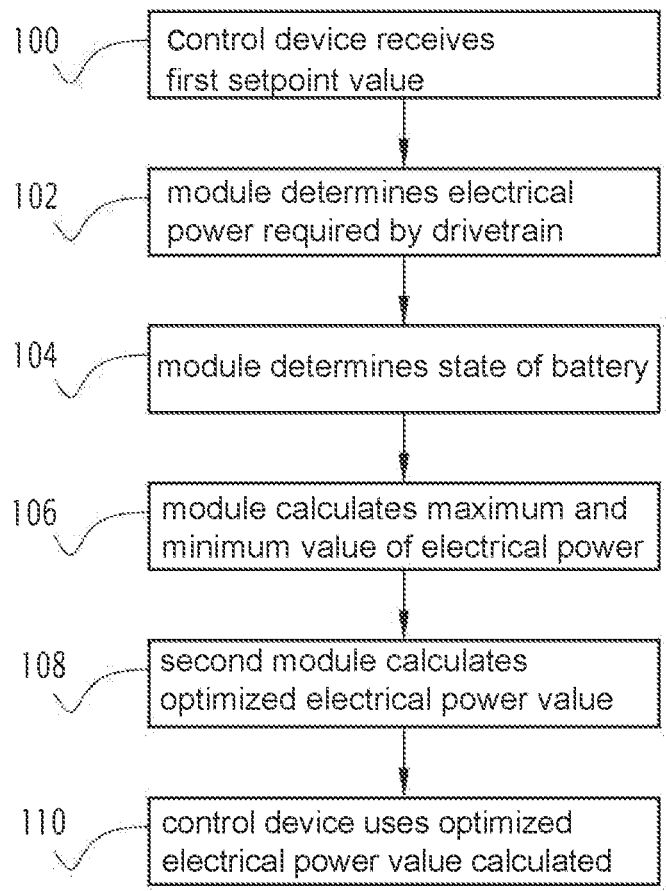
FIG. 3 is a flowchart illustrating steps of an example of a method of controlling the power supply system of FIG. 1 in accordance with one embodiment of the invention.

One example operation is now described with reference to FIG. 3.

The method starts in step 100, for example in response to a control command from a driver of the train, for example an acceleration or braking command from a traction controller, which changes the power consumption of the motor 4 and/or of the auxiliary equipment.

Alternatively, step 100 may be performed regularly, for example with a predefined periodicity.

In other embodiments, step 100 may be performed when the vehicle 2 reaches a specific geographical position, for example when the vehicle 2 passes specific points along a predefined path during its journey.

In step 100, the control device 24 receives information, namely a first setpoint value corresponding to the electrical power that the battery must provide for the power system to supply the drivetrain and auxiliary equipment.

In a step 102, the module 26 determines the electrical power required by the drivetrain and more precisely by the motor(s) 4 and the electrical power required by the auxiliary equipment.

In a step 104, the module 26 determines the state of the battery, including the state of charge of the battery and the maximum power available when charging or the maximum power available when discharging.

In a step 106, the module 26 calculates the maximum and minimum value of electrical power to be delivered by the fuel cell 8 according to the state of the power supply system and the stresses it is facing, as determined in steps 102 and 104.

In a step 108, the second module 28 calculates the optimised electrical power value to be supplied by the fuel cell from the maximum and minimum electrical power values calculated by the module 26 and according to the efficiency curve 42.

Finally, in a step 110, the control device 24 uses the optimised electrical power value calculated in this way as a setpoint to control the power supply system accordingly, so that the fuel cell 8 supplies the corresponding electrical power or, if necessary, is disconnected from the rest of the power supply system.

By optimising the operation of the fuel cell, it is possible to reduce the consumption of hydrogen without degrading the operation of the fuel cell or its ability to provide electrical power when the vehicle needs it. Thus, for a given volume of hydrogen stored in the vehicle, the vehicle's range is increased without the need to install a larger tank, which would be more expensive, more massive and more cumbersome.

Any feature of any of the above-described embodiments can be implemented in the other described embodiments and variants.

What is claimed is:

1. A method for controlling a power supply system for an electric vehicle comprising a battery, a fuel cell and a power conversion device connected to the battery and the fuel cell, the power supply system being configured to supply electrical power to an electric drivetrain of the electric vehicle and to at least one auxiliary apparatus, wherein the method comprises:

acquiring a first power setpoint value corresponding to the electrical power to be supplied by the battery;

determining the electrical power required by the electric drivetrain and the electrical power required by the at least one auxiliary apparatus;

determining a state of the battery, wherein the state of the battery comprises a state of charge of the battery and a maximum available power that the battery can provide;

calculating at least one value of electrical power to be delivered by the fuel cell depending on the state of the battery and the electrical power required by the electric drivetrain and the at least one auxiliary apparatus;

calculating, from the calculated value of electrical power, a second setpoint value for the electrical power to be delivered by the fuel cell, the second setpoint value being optimized so that the fuel cell operates at or near its maximum efficiency point; and controlling the power supply system according to the calculated second electrical power setpoint value, wherein calculating at least one value of electrical power to be delivered by the fuel cell comprises a calculation of a minimum and a maximum value of power to be delivered by the fuel cell, the second electrical power setpoint value being between said minimum and said maximum value, wherein the calculated electrical power value corresponds to the power required from the fuel cell to supplement the power supplied by the battery, the calculated electrical power value being equal to the power required for the battery to reach a target state of charge, minus the power required by the electric drivetrain and the power required by an auxiliary equipment, wherein calculating of the second power setpoint value is carried out based on a predefined efficiency curve of the fuel cell, and wherein calculating of the second power setpoint value comprises selecting an operating point of the fuel cell corresponding to the maximum of the efficiency curve within an operating range between the minimum value and the previously calculated maximum value, and wherein the first power setpoint value is previously calculated based on a target value of the target state of charge of the battery, said target value being recalculated over time according to fluctuations in the charge of the battery and stresses imposed on the power supply system by the electric drivetrain and by the at least one auxiliary apparatus of the electric vehicle.

2. The method of claim 1, wherein the minimum value is equal to a sum of the power required by the electric drivetrain and the power required by auxiliary components minus the maximum power that can be delivered by the battery.

3. The method of claim 1, wherein the maximum value is equal to a sum of the power required by the electric drivetrain and the power required by auxiliary components minus the minimum power that can be delivered by the battery.

4. The method of claim 1, wherein the method is implemented in response to a control command from a driver of the electric vehicle, for example an acceleration or braking command, which has effect of changing a power consumption of the electric drivetrain and/or the auxiliary apparatus.

5. The method of claim 1, wherein the second power setpoint value is selected so that when the fuel cell delivers electrical power corresponding to the second power setpoint value, the battery delivers electrical power corresponding to the calculated first setpoint value.

6. A power supply system for an electric vehicle comprising a battery, a fuel cell and a power conversion device connected to the battery and the fuel cell, the power supply system being configured to supply electrical power to an electric drivetrain of the electric vehicle and at least one auxiliary apparatus, wherein the power supply system comprises an electronic control device programmed to implement steps comprising:

acquiring a first power setpoint value corresponding to the electrical power to be supplied by the battery;

determining the electrical power required by the electric drivetrain and the electrical power required by the at least one auxiliary apparatus;

determining a state of the battery, wherein the state of the battery comprises a state of charge of the battery and a maximum available power that the battery can provide;

calculating at least one value of electrical power to be delivered by the fuel cell depending on the state of the battery and the electrical power required by the electric drivetrain and the at least one auxiliary apparatus;

calculating, from the calculated value of electrical power, a second setpoint value for the electrical power to be delivered by the fuel cell, the second setpoint value being optimized so that the fuel cell operates at or near its maximum efficiency point; and controlling the power supply system according to the calculated second electrical power setpoint value, wherein calculating at least one value of electrical power to be delivered by the fuel cell comprises the calculating of a minimum and a maximum value of power to be delivered by the fuel cell, the second electrical power setpoint value being between said minimum and said maximum value, wherein the calculated electrical power value corresponds to the power required from the fuel cell to supplement the power supplied by the battery, the calculated electrical power value being equal to the power required for the battery to reach a target state of charge, minus the power required by the electric drivetrain and the power required by and auxiliary equipment, in which the calculating of the second setpoint value is carried out based on a predefined efficiency curve of the fuel cell, and in which the calculating of the second setpoint value comprises selecting an operating point of the fuel cell corresponding to the maximum of the efficiency curve within an operating range between the minimum value and the previously calculated maximum value, and wherein the first power setpoint value is previously calculated based on a target value of the target state of charge of the battery, said target value being recalculated over time according to fluctuations in the charge of the battery and stresses imposed on the power supply system by the electric drivetrain and by the at least one auxiliary apparatus of the electric vehicle.

7. An electric vehicle comprising a power supply system according to claim 6.

* * * * *